C. A. GARRETT.
SAFETY DEVICE FOR MECHANICAL MOVEMENTS.
APPLICATION FILED SEPT. 22, 1915.

1,199,884.

Patented Oct. 3, 1916.
2 SHEETS—SHEET 1.

Inventor:
Charles A. Garrett,
By Chas. N. Butler
Attorney.

C. A. GARRETT.
SAFETY DEVICE FOR MECHANICAL MOVEMENTS.
APPLICATION FILED SEPT. 22, 1915.

1,199,884.

Patented Oct. 3, 1916.
2 SHEETS—SHEET 2.

Inventor:
Charles A. Garrett,
By Chas. N. Butler
Attorney

UNITED STATES PATENT OFFICE.

CHARLES A. GARRETT, OF PHILADELPHIA, PENNSYLVANIA.

SAFETY DEVICE FOR MECHANICAL MOVEMENTS.

1,199,884.  Specification of Letters Patent.  Patented Oct. 3, 1916.

Application filed September 22, 1915. Serial No. 51,940.

*To all whom it may concern:*

Be it known that I, CHARLES A. GARRETT, a citizen of the United States, residing in the city of Philadelphia, county of Philadelphia, and State of Pennsylvania, have invented a Safety Device for Mechanical Movements, of which the following is a specification.

My invention is an improved safety device designed for the purpose of protecting machine operators from injury.

The improved device is especially adapted for use in punching, cutting, pressing, corner staying and other machines in which the hands of operators are liable to be caught in manipulating the work, with resulting injury, but it will be understood that its application is general.

Machines equipped with my improvements possess the desired characteristic of advancing the die, punch or other tool to the work or work holder in such manner that the actuating force is readily overcome until a point is past where injury cannot be done to the operative and the positive engagement necessary to do the work is not effected until the tool has reached a position so close to the work and work holder that the hand of the operative cannot be caught.

The characteristic features and functions of the invention will be fully understood from the following description and the accompanying drawings of mechanism embodying such invention.

Figure 1:
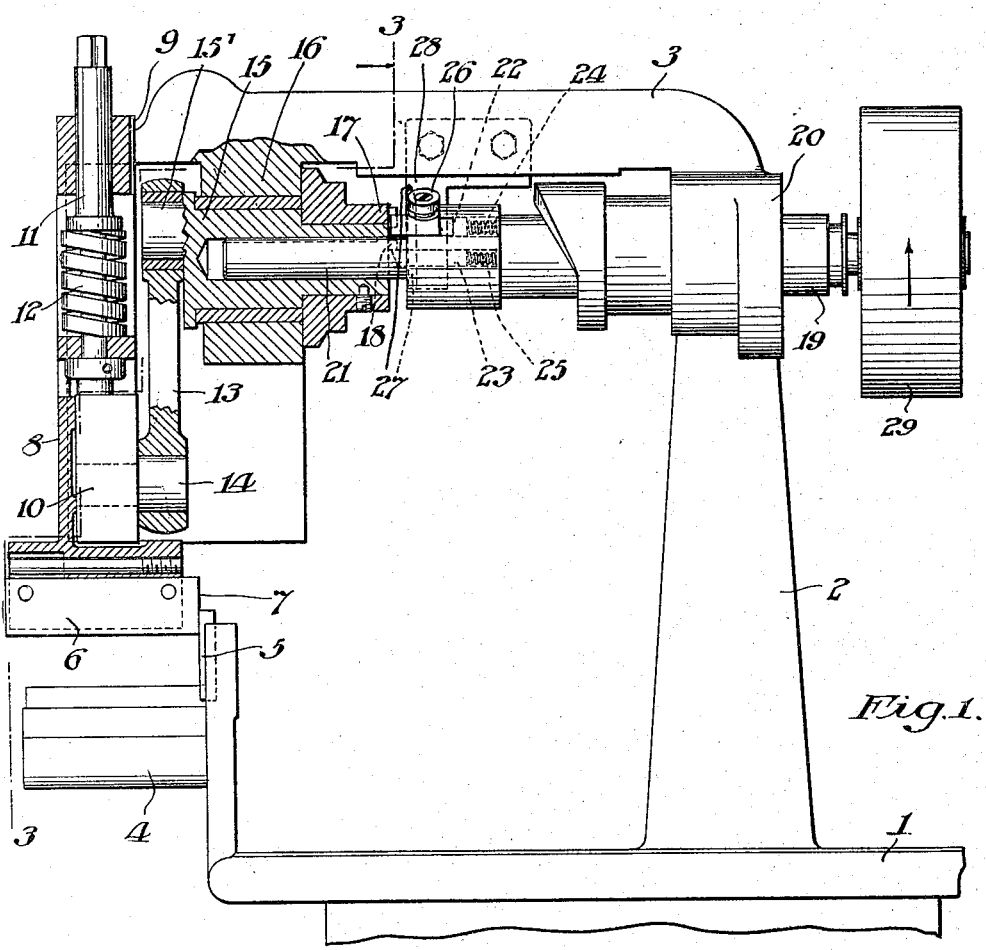
Figure 2:
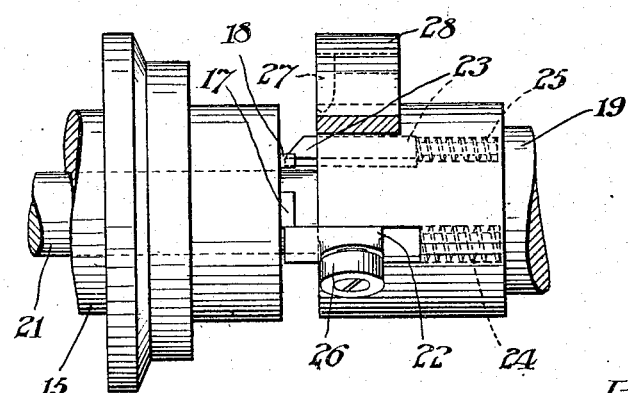
Figure 3:
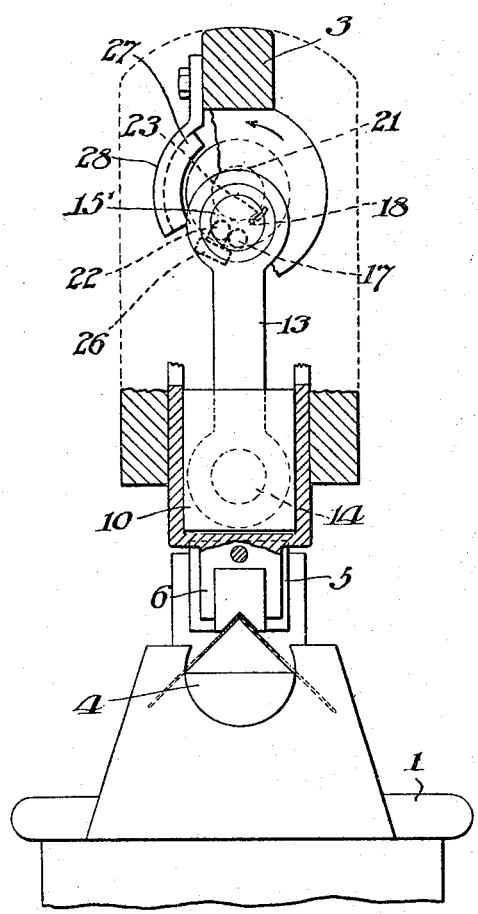
Figure 4:
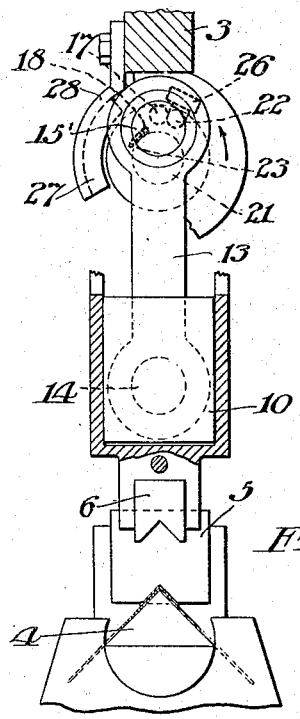
Figure 5:
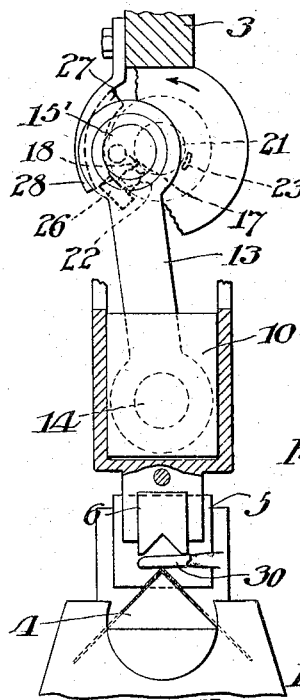

In the drawings, Figure 1 is a sectional elevation of mechanism embodying the invention; Fig. 2 is an enlarged broken sectional view illustrating details of the construction; Fig. 3 is a sectional view on the irregular line 3—3 of Fig. 1; Fig. 4 is a sectional view similar to that shown in Fig. 3 with parts of the mechanism in a second position; and Fig. 5 is a sectional view similar to that shown in Fig. 3 with parts of the mechanism in a third position.

The drawings illustrate a corner stay machine comprising a base 1 provided with a column 2 carrying an arm 3, together with an anvil 4 and a shear 5 supported by the base, a reciprocatory die 6 and knife 7 adapted to coöperate with the anvil and shear, a reciprocatory head 8 fixed to the die and movable in the guide 9 carried by the arm, a block 10 movable in the head, an adjust-
able stem 11 fixed to the block and having a limited movement in the head under control of the spring 12, and a pitman 13 journaled on a stud 14 of the block which is thereby caused to act through the stem and spring to reciprocate the head, in accordance with a previously known construction.

In accordance with my improvements, the pitman 13 has journaled therein a stud 15' fixed eccentrically on a hollow shaft section or stub shaft 15 which is journaled in the bearing 16 of the arm, the shaft having on the end thereof opposite the journal 15' the eccentrically disposed studs 17 and 18 fixed at different distances from their axis of rotation. A shaft or shaft section 19, journaled in the bearing 20 of the column, is provided with a stem 21 which is journaled in the shaft section 15 and with the reciprocatory bolts 22 and 23 adapted for engaging the respective studs 17 and 18, the bolts being pressed forward in their seats in the section 19 by the respective springs 24 and 25 disposed in said seats. A roller 26 is journaled on the bolt 22, so as to rotate about an axis transverse to the bolt's length, and is adapted to engage a cam 27 carried by a bracket 28 which is fixed to the arm 3, the cam being disposed so as to effect the retraction of the bolt at the beginning of its downward movement in the rotation of the shaft section 19 and to hold it in such retracted position throughout the greater part of its descent.

In the operation of the mechanism, the pulley 29 is revoluble in the direction of the arrow thereon, the shaft section 19 is revolved therewith and the shaft section 15 is revolved by the automatic engagement of the bolt 22 with the stud 17 when the roller 26 clears the cam 27 and by gravity when the cam engages the roller to retract the bolt so that it clears the stud. It will be observed that the studs 15' and 17 are disposed so that they lie in the same or approximately the same radial plane with reference to their axis of rotation; hence, in the normal operation, when the bolt 22, at the beginning of its descent, is withdrawn from the stud 17, the simultaneously descending stud 15' is actuated to turn the shaft section 15 by the weight of the descending connected devices comprising the parts 6, 8, 10 and 13. The stud 17 is thereby caused to travel downward ahead of the bolt 22 and is reengaged thereby when the roller 26 has cleared the cam 27, so that the die 6 and knife 7 are driven downward positively by the shaft section 19 through the final limited space required for shearing the material and staying the product resting on the anvil 4, such distance being little more than the thickness of the material. In the event a part 30, as a finger, of the operative's person should be caught upon the anvil or shear by the descending knife or die, the descent of the latter will be stopped, and, through the intermediate parts, will stop the stud 17 so that it will lie back of the bolt 22 when the latter is released by the cam 27 and in this position of the stud it remains clear of the continuously revolving bolt.

The stud 18 and bolt 23 are provided to prevent the too rapid turning of the part 15 ahead of the part 19, the stud engaging the bolt for this purpose. But in the event of the stud being stopped, as when the hand of the operative is caught between the anvil and the die, it will act upon the beveled end of the bolt to retract it so that the continuously revolving bolt will not act to force down the die.

Having described my invention, I claim:

1. In apparatus of the character described, a plurality of revoluble members, means whereby one of said members automatically engages and actuates the other through a limited part of its movement, and mechanism whereby said means are automatically disengaged alternately with said engagements, through the remainder of said movement.

2. In apparatus of the character described, a plurality of revoluble members, and means whereby one of said members is automatically engaged and disengaged with reference to the other continuously.

3. In apparatus of the character described, a revoluble shaft section, a second revoluble shaft section, means comprising a revoluble and reciprocating device whereby one of said sections is automatically engaged with the other, mechanism engaged by said device to effect the disengagement of said sections periodically and means movable by said sections when engaged and automatically when said sections are disengaged.

4. In apparatus of the character described, a revoluble shaft section, a second revoluble shaft section, a projection carried by one of said sections, a device carried by and movable relatively to the other of said sections for engaging said projection, means in the path of said device for automatically withdrawing it from said projection periodically, and force applying means positively driven by said sections when engaged and movable automatically when said sections are disengaged.

5. In apparatus of the character described, a revoluble shaft section, a second revoluble shaft section, a projection on one of said sections, a reciprocating bolt carried by the other of said sections for engaging said projection, means comprising a cam for withdrawing said bolt from said projection periodically and forcing means operated by a section aforesaid when said bolt engages said projection and adapted to act on said section to prevent the engagement of said bolt with said projection.

6. In apparatus of the character described, a revoluble shaft section, means adapted to be actuated by and to actuate said section, a second revoluble shaft section, and automatically operating means adapted for connecting and disconnecting said sections in each revolution of said second section.

7. In apparatus of the character described, a revoluble shaft section, a reciprocatory mechanism having an eccentric connection with said shaft section, a second revoluble shaft section, means carried by said second shaft section for connecting it to said shaft section first named, and a device for effecting the disengagement of said means throughout a part of the movement to its work of said reciprocatory mechanism.

8. In apparatus of the character described, a reciprocatory head, a revoluble shaft section, means whereby said head is connected with said section, a second revoluble shaft section, means whereby said shaft section second named is automatically engaged with and positively drives said shaft section first named to force said head at the end of its working stroke, and a cam for operating said means to disengage said sections as the head acts through a previous part of its working stroke.

9. In apparatus of the character described, a vertically reciprocatory member, a revoluble shaft section, means comprising an eccentric for connecting said section with said member, a second revoluble shaft section, means for automatically effecting the engagement of said sections whereby the first is driven by the second, and mechanism acting upon said means to effect the disengagement of said sections throughout the greater part of the downward stroke of said member and to permit said engagement throughout the remainder of said downward stroke.

10. In apparatus of the character described, a work holder, vertically reciprocating mechanism for acting upon work on said holder, a revoluble shaft section, means comprising an eccentric for connecting said shaft section with said mechanism whereby said section is adapted for actuating said mechanism and said mechanism is adapted for actuating said section, a second revoluble shaft section, a reciprocatory bolt carried by said shaft section second named and adapted for automatically engaging said shaft section first named, and means comprising a cam for retracting said bolt and disengaging said sections during downward movement of said mechanism, said cam permitting the operation of said bolt to effect the engagement of said sections during a part of said downward movement necessary for performing the work.

11. In apparatus of the character described, a work holder, a reciprocatory device for pressing work thereon, a revoluble shaft section having projections thereon, means comprising an eccentric for connecting said device with said section, a second revoluble shaft section, spring pressed bolts adapted to reciprocate in said second shaft section and to engage said projections respectively whereby said shaft section first named is turned by said section second named and is prevented from advancing substantially with relation thereto, and a cam for disengaging the bolt by which said second section drives said first section.

12. In apparatus of the character described, the combination with supporting means comprising a work holder, of a head adapted to reciprocate in a guide of said supporting means, a device on said head for acting on work supported by said holder, a driven shaft journaled in a bearing of said supporting means, means whereby said shaft reciprocates said head, a driving shaft journaled in a bearing of said supporting means, a spring pressed bolt whereby said driving shaft operates said driven shaft to press said device on the work and elevate said device, and means comprising a cam carried by said supporting means whereby said bolt is held out of engagement and said driven shaft is adapted to be held at rest by an object but slightly thicker than the work and disposed between said device and work holder.

13. The combination of a reciprocating work-performing member, an actuating mechanism for reciprocating said member, said mechanism comprising a driving part and a driven part connecting with said reciprocating member, a releasable means of connection between said parts adapted to automatically connect the same when said reciprocating member has reached a determinate position during the operative stroke thereof and said driven parts have reached a relative position in relation to said driving parts, and other means assisting in the control of said releasable connection.

14. The combination of a reciprocating work-performing member, an actuating mechanism for reciprocating said member, said mechanism comprising a driving part and a driven part connecting with said reciprocating member, a releasable means of connection between said parts adapted when released to become automatically effective and connect said parts when said reciprocating member has reached a determinate position during the operative stroke thereof and said driven part has reached a relative position with relation to said driving part, and other means for automatically releasing said releasable connection during the operative stroke of said releasable connection prior to said work-performing member reaching the determinate position as aforesaid.

15. The combination of a reciprocating work-performing member, an actuating mechanism for reciprocating said member, said mechanism comprising a driving part and a driven part, a normally operative releasable means of connection between said parts adapted when released to become automatically effective and connect said parts when said reciprocating member has reached a determinate position during the operative stroke thereof and said driven member has reached a relative position with relation to said driving part, and other means for effecting the automatic release of said releasable connection during the operative stroke of said reciprocating member after the initial movement of said member in making its operative stroke and prior to said member reaching the determinate position as aforesaid.

16. The combination of a reciprocating work-performing mechanism, an actuating mechanism for reciprocating said member, said mechanism comprising a driving part and a driven part connecting with said reciprocating member, said reciprocating member being adapted to fall by gravity during the operative stroke thereof when said driven part is disconnected from said driving part and during such gravitational movement of the reciprocating member said driven part being movable therewith, a normally operative releasable means of connection between said parts adapted when released to become automatically effective and connect said parts when said reciprocating member has reached a determinate position during the gravitational movement thereof and said driven member has been moved to assume a relative position with relation to said driving member, and other means for automatically releasing said releasable connection during the gravitational movement of said work-performing member after the initial operative movement thereof and prior to its reaching the determinate position as aforesaid.

17. In an apparatus of the character described, a work-performing member, rotatable means for actuating said member, driving means for imparting rotary motion to said actuating member, and means for disengaging said actuating member from its driving means at a predetermined period in its rotation, prior to the completion of the working stroke of said member.

18. In an apparatus of the character described, a reciprocating work-performing member, rotatable means for actuating said member, driving means for imparting rotary motion to said actuating member and means for disengaging said actuating member from its driving means during a portion of the down stroke of said work performing member.

In testimony whereof I have hereunto set my name this 21st day of September, 1915.

CHAS. A. GARRETT.

Copies of this patent may be obtained for five cents each, by addressing the "Commissioner of Patents, Washington, D. C."